United States Patent
Yamamoto

(10) Patent No.: US 8,164,315 B2
(45) Date of Patent: Apr. 24, 2012

(54) POWER SUPPLY CIRCUIT

(75) Inventor: Ryuji Yamamoto, Yao (JP)

(73) Assignees: Sanyo Electric Co., Ltd., Osaka (JP); Sanyo Semiconductor Co., Ltd., Gunma (JP)

( * ) Notice: Subject to any disclaimer, the term of this patent is extended or adjusted under 35 U.S.C. 154(b) by 451 days.

(21) Appl. No.: 12/547,116

(22) Filed: Aug. 25, 2009

(65) Prior Publication Data
US 2010/0045252 A1   Feb. 25, 2010

(30) Foreign Application Priority Data
Aug. 25, 2008   (JP) ................. 2008-215521

(51) Int. Cl.
*G05F 1/575* (2006.01)
(52) U.S. Cl. ........................................ 323/268
(58) Field of Classification Search .......... 323/268
See application file for complete search history.

(56) References Cited

U.S. PATENT DOCUMENTS

| | | | | |
|---|---|---|---|---|
| 4,446,440 | A * | 5/1984 | Bell ................. | 330/10 |
| 6,972,546 | B2 * | 12/2005 | Kobayashi ............ | 323/225 |
| 2007/0247124 | A1 * | 10/2007 | Mihashi ............. | 323/224 |

FOREIGN PATENT DOCUMENTS

| | | |
|---|---|---|
| JP | 2005-174264 | 6/2005 |
| JP | 2006-54969 | 2/2006 |

OTHER PUBLICATIONS esp@cenet patent abstract for Japanese Publication No. 2005174264, Publication date Jun. 30, 2005 (1 page).
esp@cenet patent abstract for Japanese Publication No. 2006054969, Publication date Feb. 23, 2006 (1 page).

* cited by examiner

*Primary Examiner* — Harry Behm
(74) *Attorney, Agent, or Firm* — Osha Liang LLP

(57) ABSTRACT

When an output of an overall output terminal (18) of a power supply circuit (10) is switched from a series regulator section (14) to a switching regulator section (12), a fifth switch (55) is switched OFF, to temporarily open a feedback loop of the switching regulator section (12), a sixth switch (56) is maintained at an ON state, to output the output of the series regulator section (14) to the overall output terminal (18), and an artificial feedback loop is formed between an output terminal of an error amplifier (24) and a second terminal of the error amplifier (24), to output a voltage corresponding to the output of the series regulator section (14) to the output terminal of the error amplifier (24) and charge a phase compensating capacitor (26) of the switching regulator section (12).

4 Claims, 8 Drawing Sheets

POWER SUPPLY CIRCUIT

CROSS-REFERENCE TO RELATED APPLICATIONS

This application claims priority from Japanese Patent Application No. 2008-215521 filed on Aug. 25, 2008, the entire disclosure of which is incorporated herein by reference.

BACKGROUND OF THE INVENTION

1. Field of the Invention

The present invention relates to a power supply circuit, and in particular to a power supply circuit which switches between an output of a switching regulator and an output of a series regulator, and supplies the selected output to a load.

2. Description of the Related Art

A battery is used as a power supply of a portable electronic device such as a portable phone, a PHS (Personal Handy phone System), a PDA (Personal Digital Assistant), and a PC (Personal Computer). In order to generate a predetermined voltage to be supplied to the constituent elements of the electric device, a series regulator is used. In addition to the series regulator, a switching regulator is also used.

The series regulator can be formed using a feedback amplifier having a reference voltage input terminal to which a reference voltage is input, a feedback input terminal to which an output is input through a feedback gain, and an output terminal section.

As an example structure of the switching regulator, for example, JP 2005-174264 A discloses a voltage boosting switching regulator of a chopper type as a circuit for boosting a reduced power supply voltage to a predetermined output voltage so that a portable device can be driven even when a power supply voltage supplied from a battery equipped in the portable device having a communication function is reduced. In this reference, an example configuration is disclosed comprising an error amplifier, which compares the output voltage of the switching regulator to the reference voltage and outputs an error signal corresponding to the difference between the output voltage and the reference voltage, a PWM (pulse-width modulation) circuit which sets a duty ratio of a PWM signal based on the error signal from the error amplifier, a switching transistor which is switched ON when the PWM signal is at the high level, a voltage boosting coil having an amount of flowing current controlled in accordance with switching control of the switching transistor, and a capacitor which holds the voltage from the voltage boosting coil and outputs an output voltage.

As the distinguishing usage between the series regulator and the switching regulator, JP 2006-54969 A discloses that a method is often used in which the switching regulator is used when the power consumption of the CPU is high and the series regulator is used in a stand-by state in which the power consumption is low, in order to improve the power usage efficiency when a voltage is reduced from the battery and supplied to the CPU in the portable electronic device.

When the series regulator and the switching regulator are compared, it can be seen that the latter has a better conversion efficiency when the load is heavy, that is, when a greater amount of output current is necessary. Therefore, a method is employed as described in JP 2006-54969A where both the series regulator and the switching regulator are equipped in the portable electronic device, and the series regulator and the switching regulator are switched so that the output of the latter is used when the load is heavy, and the output of the former is used during light load.

In order to set the output voltage of the switching regulator to be in a predetermined range, feedback control is applied in which the output voltage and the reference voltage are compared using the error amplifier. In this case, because the switching regulator uses the PWM technique, if the pulse width does not match due to deficiency in phase compensation or the like, the operation of the switching regulator becomes unstable. In particular, when the switching regulator is switched from the OFF state to the ON state, the pulse generation is in transition, and the feedback of the output voltage to the error amplifier may not be sufficient. Because of this, when the output is switched from the series regulator to the switching regulator, noise may be caused.

SUMMARY OF THE INVENTION

An advantage of the present invention is that a power supply circuit is provided which can inhibit noise during switching of output from a series regulator to a switching regulator.

According to one aspect of the present invention, there is provided a power supply circuit in which an output of a switching regulator section and an output of a series regulator section are switched and output to an overall output terminal, the power supply circuit comprising a switching regulator output unit which activates the switching regulator section, switches a first loop switching switch provided between the switching regulator section and the overall output terminal to an ON state, to form a feedback loop between the overall output terminal and an error amplifier of the switching regulator section, stops operation of the series regulator section, and switches a second loop switching switch between the series regulator section and the overall output terminal to an OFF state, to output the output of the switching regulator section to the overall output terminal, a series regulator output unit which activates the series regulator section, switches the second loop switching switch to an ON state, stops operation of the switching regulator section, and switches the first loop switching switch to an OFF state, to open the feedback loop between the overall output terminal and the error amplifier and output the output of the series regulator section to the overall output terminal, and a transition process unit which applies a transition process in which, when a state is switched from a state where the output of the series regulator section is output to the overall output terminal to a state where the output of the switching regulator section is output, the first loop switching switch is switched to the OFF state while the series regulator section and the switching regulator section are activated, to temporarily open the feedback loop of the switching regulator section, the second loop switching switch is maintained in the ON state, to output the output of the series regulator section to the overall output terminal, an artificial feedback loop is formed between an output terminal of the error amplifier and a second terminal of the error amplifier, to output a voltage corresponding to the output of the series regulator section on the output terminal of the error amplifier and charge a phase compensating capacitor of the switching regulator section with the output voltage, and then, the artificial feedback loop is opened, to re-form the feedback loop between the overall output terminal and the error amplifier of the switching regulator section.

BRIEF DESCRIPTION OF THE DRAWINGS

A preferred embodiment of the present invention will be described in detail by reference to the drawings, wherein.

DESCRIPTION OF THE PREFERRED EMBODIMENT

Figure 1:
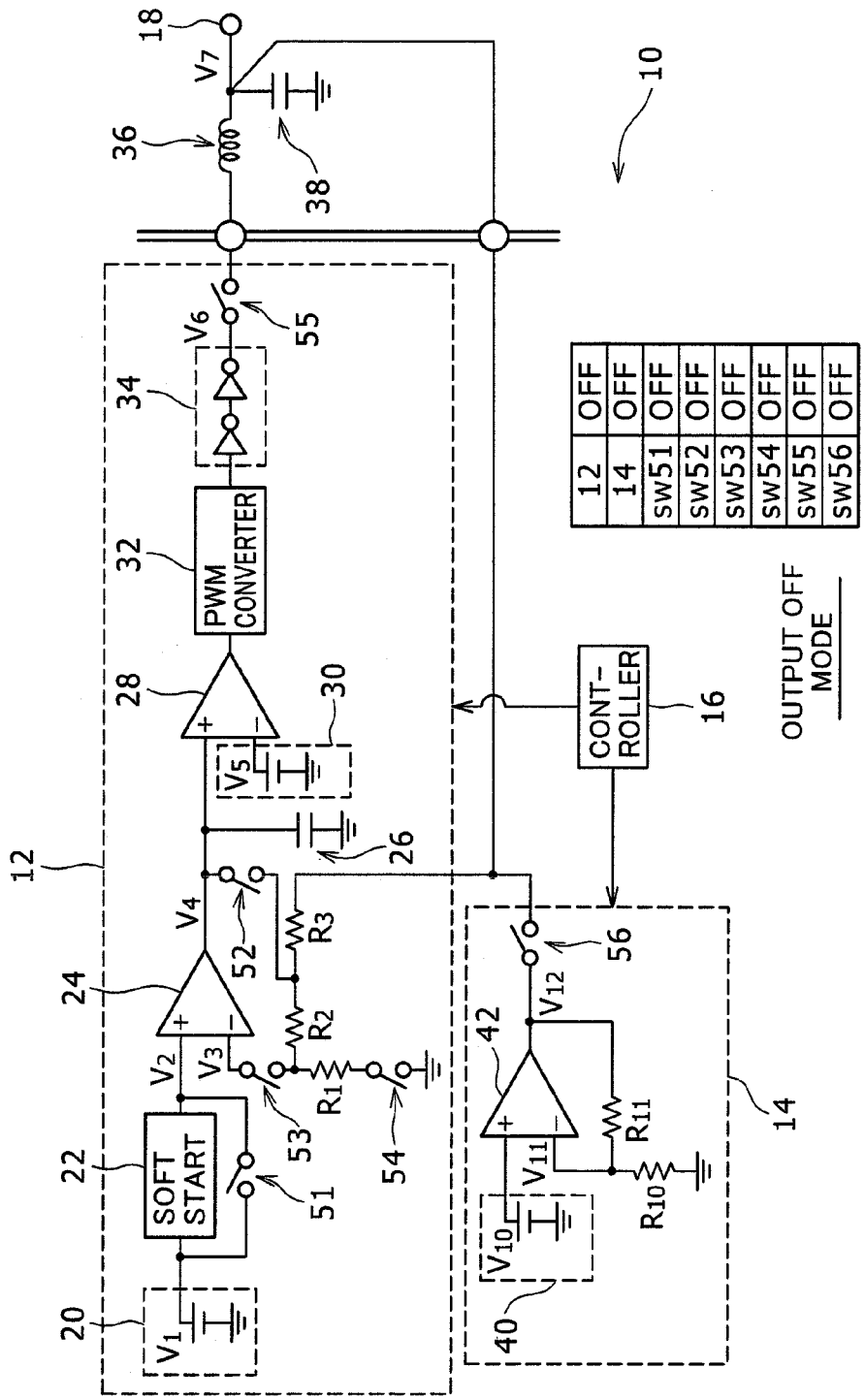
FIG. 1 is a diagram showing an overall structure of a power supply circuit in a preferred embodiment of the present invention.

A preferred embodiment of the present invention will now be described with reference to the drawings. In the following description, a configuration is described wherein the switching regulator has a structure of a soft start circuit —an error amplifier—a phase compensating capacitor—a PWM comparator—a PWM converter—an output stage circuit. However, the present invention is not limited to such a configuration, and other elements may be suitably added or a plurality of elements may be integrated into one element. For example, the PWM converter and the output stage may be integrated.

In the following description, a switch will be described as a unit for opening a loop or forming a loop. However, the term "switch" will be used not only to refer to a connection point switching switch, but in a wider definition including a semiconductor switching element, a switching circuit, etc. Therefore, the ON state of the switch refers to formation or the like of the loop, and the OFF state of the switch refers to opening or the like of the loop.

In the following description, the same reference numerals are assigned to similar elements in multiple figures and repeated description will not be given. In addition, in the description, reference numerals that are already described will be used as necessary.

FIG. 1 is a diagram showing an overall structure of a power supply circuit 10 which switches between an output of a switching regulator and an output of a series regulator and outputs the selected output to an overall output terminal. The power supply circuit 10 comprises a switching regulator section 12, a series regulator section 14, and a controller 16. According to a current required by a load connected to an overall output terminal 18, the power supply circuit 10 activates the switching regulator section 12 when the load is a high load and activates the series regulator section 14 when the load is a low load, and supplies one of the outputs through the overall output terminal 18 to the load. For this purpose, the power supply circuit 10 has a structure wherein the outputs of the switching regulator section 12 and the series regulator section 14 are connected, and a capacitor 38 which is an averaging capacitor common to the two regulator sections is connected, to form the overall output terminal 18 to the load.

The power supply circuit 10 in particular has a function to execute a transition process for reducing noise when the state is switched from a state where the output of the series regulator section 14 is output to the overall output terminal 18, to a state where the output of the switching regulator section 12 is output. For the switching of the outputs from the two regulators to the overall output terminal 18, and the transition process, the power supply circuit 10 comprises 6 switches, that is, a first switch 51 to a sixth switch 56. The controller 16 has a function to control the states of these switches, to execute a switching control of 5 modes including an output OFF mode, a soft start mode, a PWM mode, an LDO mode, and a transition mode.

The output OFF mode is a mode where the power supply circuit 10 is not operating, such as, for example, a state where the overall power supply is switched OFF, or a state where the overall power supply is switched ON, but no circuit element is operating. The output OFF mode is a starting point for all other modes of the power supply circuit 10, and FIG. 1 shows the power supply circuit 10 in the state of the output OFF mode. In the output OFF mode, neither the switching regulator section 12 nor the series regulator section 14 is operating, and all of the six switches from the first switch 51 to the sixth switch 56 are switched OFF.

Figure 2:
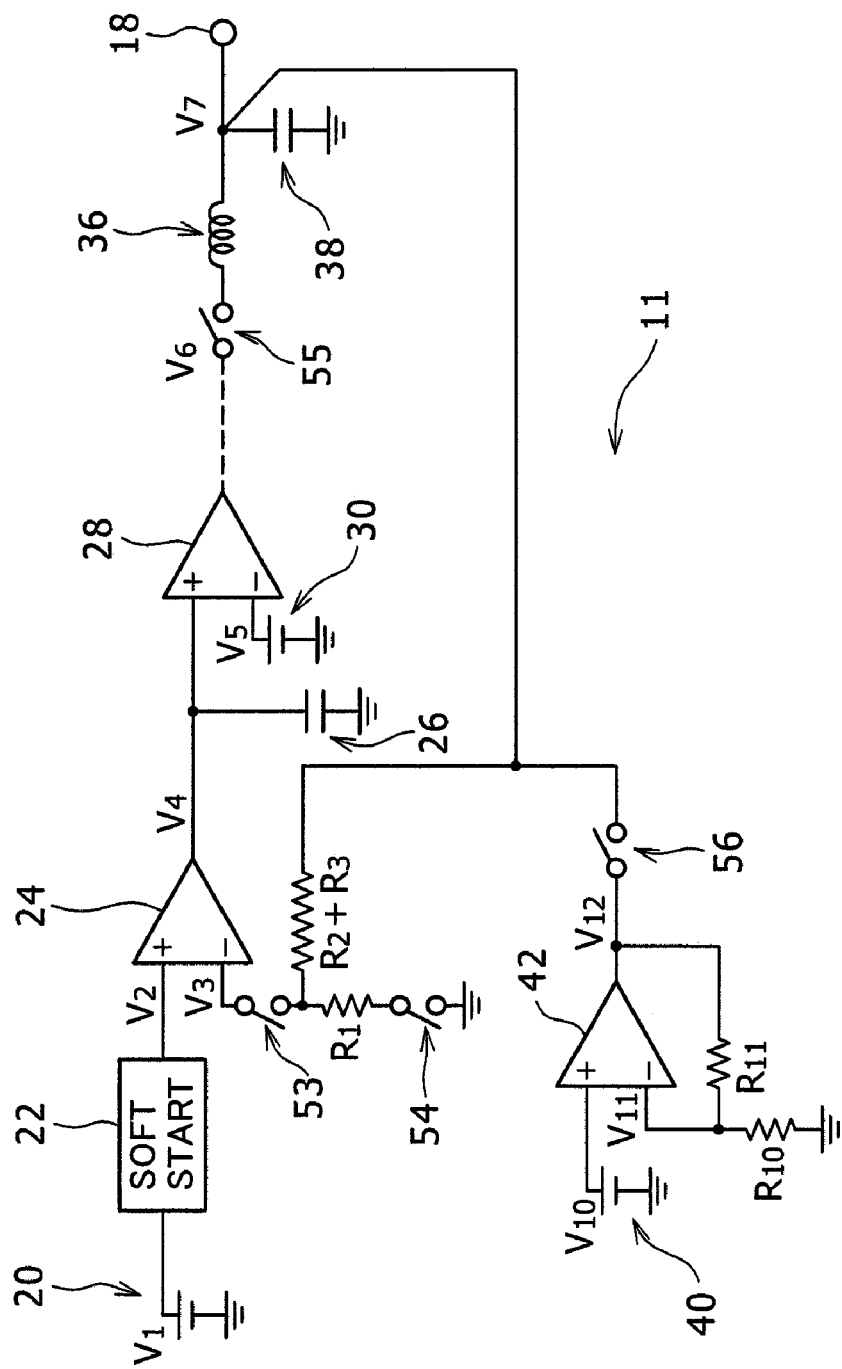
FIG. 2 is a diagram showing a structure of a power supply circuit of related art.

FIG. 2 is a diagram showing a structure of a power supply circuit 11 of related art, and shows sections that differ from the power supply circuit 10 of FIG. 1, and unrelated sections are not shown. As is clear from comparison of FIGS. 1 and 2, the power supply circuit 11 of the related art does not have the first switch 51 and the second switch 52 which is provided in the power supply circuit 10 of FIG. 1.

Figure 3:
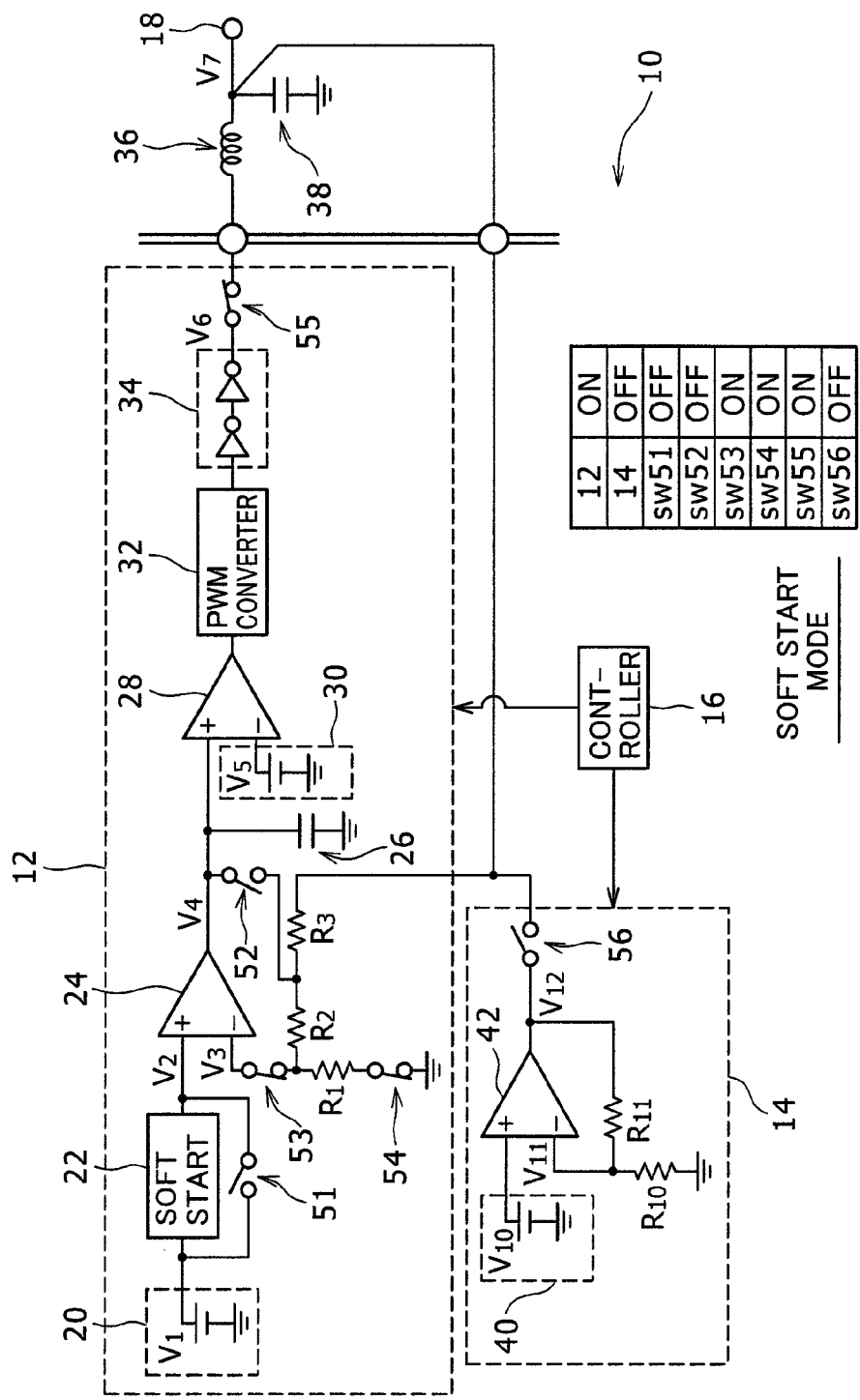
FIG. 3 is a diagram showing ON/OFF states of the switches during a soft start mode in a preferred embodiment of the present invention.
Figure 4:
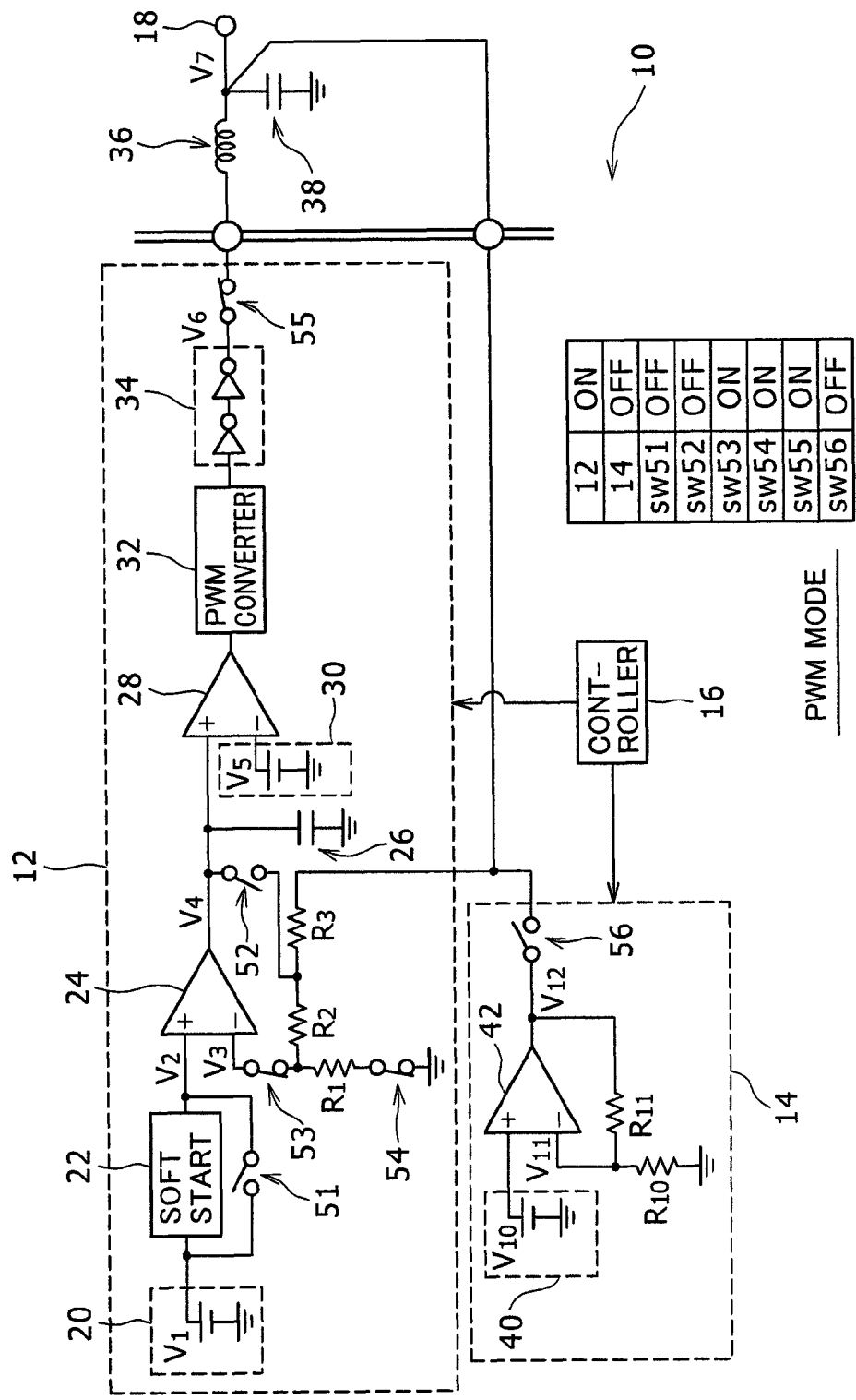
FIG. 4 is a diagram showing ON/OFF states of the switches during a PWM mode in a preferred embodiment of the present invention.
Figure 5:
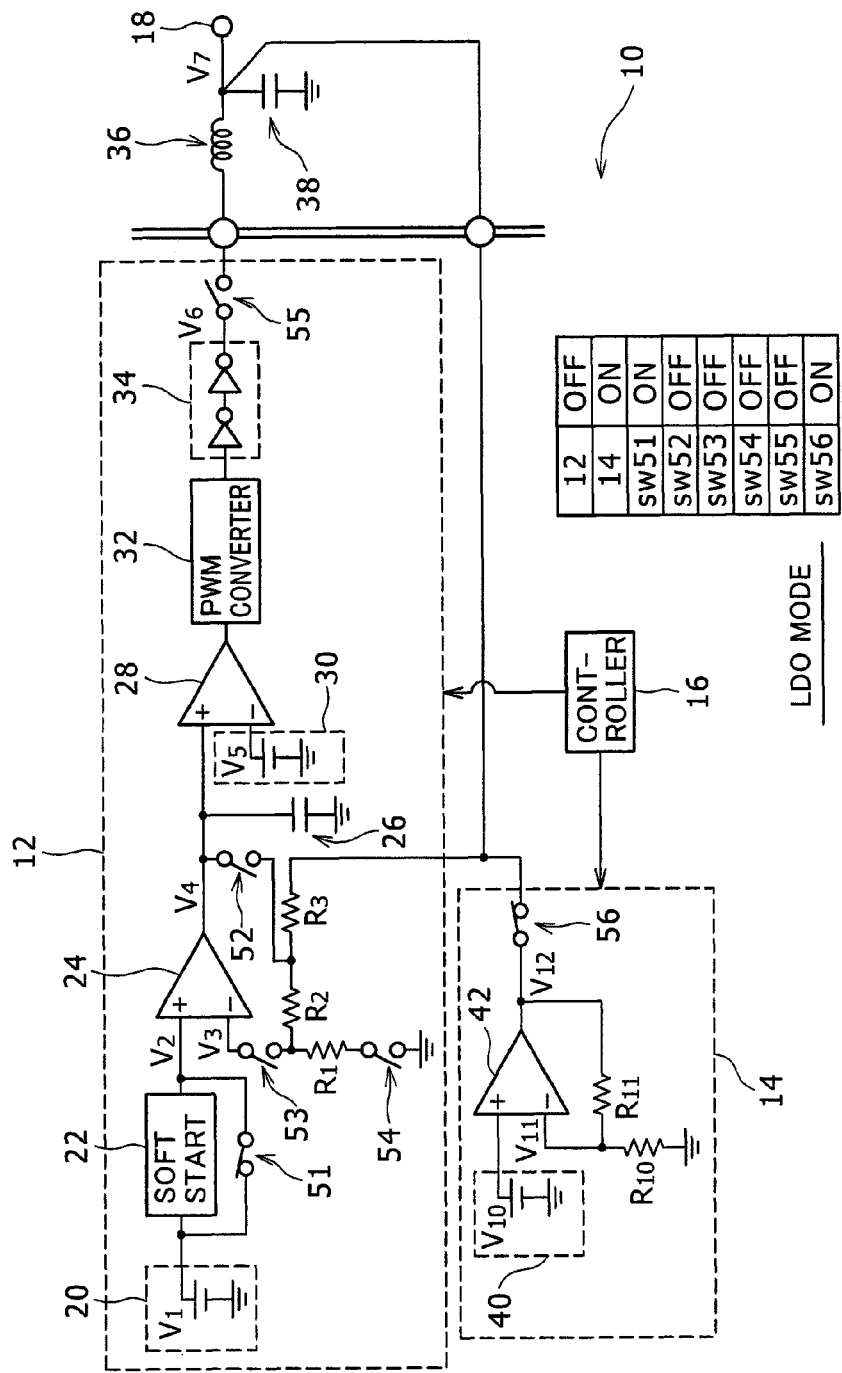
FIG. 5 is a diagram showing ON/OFF states of the switches during an LDO mode in a preferred embodiment of the present invention.
Figure 6:
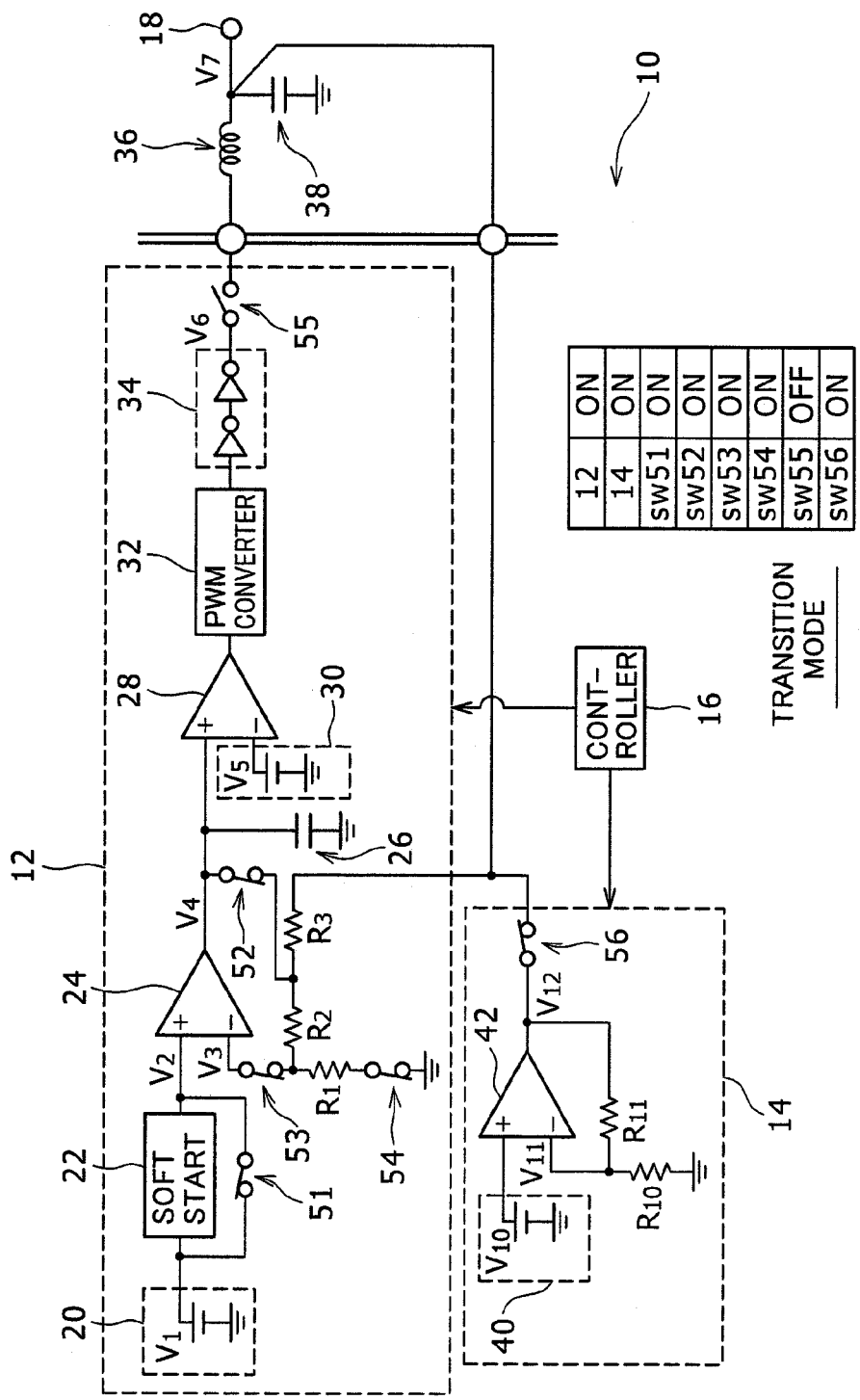
FIG. 6 is a diagram showing ON/OFF states of the switches during a transition mode in a preferred embodiment of the present invention.

FIG. 3 is a diagram showing ON/OFF states of the switches in the soft start mode. FIG. 4 is a diagram showing ON/OFF states of the switches in the PWM mode. The PWM mode is a mode where the output of the switching regulator section 12 is output to the overall output terminal 18, and is also called a switching regulator operating mode. FIG. 5 is a diagram showing ON/OFF states of the switches in the LDO mode. The LDO mode is a mode where the output of the series regulator section 14 is output to the overall output terminal 18, as is apparent from the fact that the series regulator section 14 is sometimes called a low dropout regulator. The LDO mode is also called a series regulator operating mode. FIG. 6 is a diagram showing ON/OFF states of the switches in the transition mode. The details of the transition mode will be described later, and is a mode where a process is executed to reduce the noise when the state is switched from the state where the output of the series regulator section 14 is output to the overall output terminal 18 to the state where the output of the switching regulator section 12 is output.

Referring to FIG. 1, the switching regulator section 12 comprises a first reference voltage circuit 20, a soft start circuit 22, an error amplifier 24, a phase compensating capacitor 26, a PWM comparator 28, a PWM reference voltage circuit 30 for the PWM comparator 28, a PWM converter 32, and an output stage circuit 34. In addition, the first switch 51, second switch 52, third switch 53, fourth switch 54, and fifth switch 55 are provided. As described above, of these elements, the first switch 51 and the second switch 52 are new elements that are not present in the related art.

The first reference voltage circuit 20 is a reference voltage source which generates a reference voltage $V_1$ in the switching regulator section 12. The switching regulator section 12 is a circuit which functions to output the same voltage as the first reference voltage even when there is a current variation or the like in the load, using the feedback technology.

The soft start circuit 22 is a delay circuit provided between the first reference voltage circuit 20 and a first terminal of the error amplifier 24, and corresponds to a soft start unit of the first reference voltage. The soft start circuit 22 has a function to supply the first reference voltage $V_1$ to the first terminal of the error amplifier with a predefined rise characteristic. The soft start circuit 22 is activated when the operation of the switching regulator section 12 is started. In this process, the soft start circuit 22 supplies the first reference voltage $V_1$ to the first terminal of the error amplifier 24 with a predefined rise characteristic, and when the supply voltage $V_2$ has risen to the first reference voltage $V_1$, the role of the soft start circuit 22 is completed.

The first switch 51 is a bypass switch for enabling bypassing of the soft start circuit 22. When the first switch 51 is switched ON, the first reference voltage $V_1$ is directly supplied to the first terminal of the error amplifier 24 at its voltage value. With this process, the first reference voltage $V_1$ is quickly supplied to the error amplifier 24 without the delay by the soft tart circuit 22. The first switch 51 is switched ON in the transition mode, and is maintained at the OFF state in the other modes.

The error amplifier 24 is an error amplifier which generates, as an error signal, a difference between the voltage $V_2$ which is input to a first terminal through the soft start circuit 22 and a voltage $V_3$ which is input to a second terminal, and outputs as an output voltage $V_4$ to an output terminal. The error signal has a sign. For example, when the voltage which is input to the second terminal is lower than the reference voltage, the error signal may be set to positive. The output voltage $V_4$ charges the phase compensating capacitor 26, and is output toward a first terminal of the PWM comparator 28.

When the voltage $V_3$ which is input to the second terminal of the error amplifier 24 is a feedback voltage, the error amplifier 24 functions so that the feedback voltage becomes $V_2$. As described above, after the predefined rise, the voltage $V_2$ becomes the first reference voltage $V_1$. Thus, when the voltage $V_3$ which is input to the second terminal is the feedback voltage, the error amplifier 24 functions so that the feedback voltage becomes $V_1$.

A switch for forming a feedback loop and a resistor element for defining a feedback gain are placed between the output terminal of the error amplifier 24, the second terminal of the error amplifier 24, and the overall output terminal 18. A structure around the error amplifier 24 will now be described in detail.

As shown in FIG. 1, around the error amplifier 24, a resistor element $R_3$, a resistor element $R_2$, and a resistor element $R_1$ are sequentially connected in series in this order and placed from the overall output terminal 18 toward the side of the ground potential. More specifically, a first terminal of the resistor element $R_3$ is connected to the overall output terminal 18, a second terminal of the resistor element $R_3$ is connected to a first terminal of the resistor element $R_2$, a second terminal of the resistor element $R_2$ is connected to a first terminal of the resistor element $R_1$, and a second terminal of the resistor element $R_1$ is connected to the side of the ground potential.

The second switch 52 is provided between a connection point where the second terminal of the resistor element $R_3$ and the first terminal of the resistor element $R_2$ are connected and the output terminal of the error amplifier 24. In addition, the third switch 53 is provided between a connection point where the second terminal of the resistor element $R_2$ and the first terminal of the resistor element $R_1$ are connected and the second terminal of the error amplifier 24. The fourth switch 54 is provided between the second terminal of the resistor element $R_1$ and the ground potential.

The ON/OFF states of the second switch 52, third switch 53, and fourth switch 54 are controlled in the PWM mode, LDO mode, and transition mode as follows.

Specifically, in the PWM mode, the second switch 52 is switched OFF, and the third switch 53 and the fourth switch 54 are switched ON. In the related art shown in FIG. 2 also, the third switch 53 and the fourth switch 54 are provided. In this structure also, in the PWM mode, that is, in the mode where the output of the switching regulator section is output to the overall output terminal 18, the third switch 53 and the fourth switch 54 are switched ON. In the PWM mode, the fifth switch 55, which will be described later is switched ON and the sixth switch 56 to be described later is switched OFF.

When the second switch 52 is switched OFF and the third switch 53 and the fourth switch 54 are switched ON in this manner, a voltage $V_7$ of the overall output terminal 18 is applied to the first terminal of the resistor element $R_3$, and with $(R_3+R_2)$, in which the resistor element $R_3$ and the resistor element $R_2$ are combined, and the resistor element $R_1$, the connection point of $(R_3+R_2)$ and $R_1$ is connected to the second terminal of the error amplifier 24, so that the voltage $V_7$ of the overall output terminal 18 is fed back to the error amplifier 24. In other words, the signal lines connecting the overall output terminal 18 and the three resistor elements related to the error amplifier 24 become a feedback loop of the switching regulator section 12.

The first reference voltage $V_1$, the output voltage $V_4$ of the error amplifier 24, the output voltage $V_7$ of the overall output terminal 18, and a gain $A_{cv}$ of all elements from the output terminal of the error amplifier 24 to the overall output terminal 18 are in the following relationship: the output voltage $V_4$ of the error amplifier 24 is $V_4 = V_7/A_{cv} = [V_1\{(R_1+R_2+R_3)/R_1\}]/A_{cv}$.

Next, in the LDO mode, the second switch 52 is switched OFF and the third switch 53 and the fourth switch 54 are also switched OFF. In the related art shown in FIG. 2 also, the third switch 53 and the fourth switch 54 are provided. In this structure also, in the LDO mode, that is, in the mode where the output of the series regulator section is output to the overall output terminal 18, the third switch 53 and the fourth switch 54 are switched OFF. In the LDO mode, the fifth switch 55, which will be described later, is switched OFF and the sixth switch 56, which will be described later, is switched ON.

When the second switch 52, third switch 53, and fourth switch 54 are switched OFF in this manner, the connection between the overall output terminal 18 and the error amplifier 24 of the switching regulator section 12 is completely opened, and the output terminal of a feedback amplifier 42 of the series regulator section 14 is connected to the overall output terminal 18. With this structure, an output voltage $V_{12}$ of the series regulator section 14 is output to the overall output terminal 18.

In the transition mode, the second switch 52 is switched ON. The third switch 53 and the fourth switch 54 are both switched ON. The second switch 52 is switched ON only in this transition mode. In the transition mode, the fifth switch 55, which will be described later, is switched OFF and the sixth switch 56, which will be described later, is switched ON. In other words, the states of the fifth switch 55 and the sixth switch 56 are identical to those in the LDO mode.

When the states of the fifth switch 55 and the sixth switch 56 are set to the same states as in the LDO mode, and the second switch 52, third switch 53, and fourth switch 54 are switched ON in this manner, the output voltage $V_{12}$ of the series regulator section 14 is applied to the first terminal of the resistor element $R_3$, and the connection point between the second terminal of the resistor element $R_3$ and the first terminal of the resistor element $R_2$ is connected to the output terminal of the error amplifier 24.

In this state, for the error amplifier 24, a feedback loop is formed which is smaller than the feedback in the PWM mode where the output voltage $V_7$ of the overall output terminal 18 is fed back by a large feedback loop including the PWM comparator 28, PWM converter 32, output stage circuit 34, etc., and in which the output voltage $V_{12}$ of the series regulator section 14 is applied with the error amplifier 24 itself as a center.

In this manner, the output voltage $V_{12}$ of the series regulator section 14 can be applied to the error amplifier 24 of the switching regulator section 12, an artificial feedback loop which is a small feedback loop can be formed between the output terminal of the error amplifier 24 and the second terminal of the error amplifier 24, and a voltage corresponding to the output voltage $V_{12}$ of the series regulator section 14 can be output on the output terminal of the error amplifier 24. Because the feedback loop is a simple feedback loop which does not include the PWM converter 32, a stable output voltage $V_4$ can be quickly converged and output to the output terminal of the error amplifier 24.

With this structure, the phase compensating capacitor 26 of the switching regulator section 12 can be charged using a stable output voltage $V_4$ due to the output voltage $V_{12}$ of the series regulator section 14. In this manner, by charging the phase compensating capacitor 26, which is in the discharged state when the state is switched from the state in which the output of the series regulator section 14 is output to the overall output terminal 18 to the state in which the output of the switching regulator section 12 is output, with a stable voltage, it is possible to reduce the noise during the output switching, which is an objective of the transition process.

With regard to the output voltage $V_4$ of the error amplifier 24, while the output voltage $V_7$ of the overall output terminal 18 is fed back in the PWM mode, the output voltage $V_{12}$ of the series regulator section 14 is applied in the transition mode. Because of this, the voltage in the transition mode may differ from the voltage in the PWM mode. In consideration of this, the connection point between the second terminal of the resistor element $R_3$ and the first terminal of the resistor element $R_2$ is connected to the output terminal of the error amplifier 24, to achieve a constant total of the resistor element $R_3$ and the resistor element $R_2$ and adjust the dividing ratio. With this structure, it is possible to adjust the output voltage $V_4$ of the error amplifier 24 to have the same value in the transition mode and in the PWM mode.

Specifically, in the transition mode, the output voltage $V_{12}$ of the series regulator section 14 is applied to the first terminal of the resistor element $R_3$, and the resistor element $R_2$ and resistor element $R_1$ are sequentially connected in series in this order from the output terminal of the error amplifier 24 toward the side of the ground potential. Because the connection point between the second terminal of the resistor element $R_3$ and the first terminal of the resistor element $R_2$ is a dividing point of a total $(R_3+R_2)$ of the resistor element $R_3$ and the resistor element $R_2$, the dividing point is connected to the output terminal of the error amplifier 24.

In the PWM mode, $(R_3+R_2)$ can be collectively considered as a resistor element. The resistor element $R_1$ will hereinafter be called a first resistor element and a resistor element having a value of $(R_3+R_2)$ will hereinafter be collectively called a second resistor element. With this notation, the dividing point of $(R_3+R_2)$ is a dividing point when the second resistor element is divided into two resistor components connected in series. Therefore, in the transition mode, the dividing point of the second resistor element is connected to the output terminal of the error amplifier 24.

In this case, the output voltage $V_{12}$ of the series regulator section 14 and the output voltage $V_4$ of the error amplifier 24 are in the following relationship: the output voltage $V_4$ of the error amplifier 24 is $V_4=V_{12}\{(R_1+R_2)/(R_1+R_2+R_3)\}$.

In the PWM mode, as described above, the output voltage $V_4$ of the error amplifier 24 is $V_4=V_7/A_{cv}=[V_1\{(R_1+R_2+R_3)/R_1\}]/A_{cv}$. The dividing point of $(R_3+R_2)$ can be determined such that the values of two $V_4$ are identical, and the determined dividing point can be connected to the output terminal of the error amplifier 24. In this manner, it is possible to adjust the output voltage $V_4$ of the error amplifier 24 to be identical in the transition mode and in the PWM mode.

The structure around the error amplifier 24 has been described. Referring again to FIG. 1, the phase compensating capacitor 26 is a capacitor provided between the output terminal of the error amplifier 24 and the first terminal of the PWM comparator 28, and has a function to compensate the zero point of the frequency in the PWM comparator to enable proper formation of the pulse width. The phase compensating capacitor 26 is charged by the output voltage $V_4$ of the error amplifier 24. Because the phase compensating capacitor 26 is used when the switching regulator section 12 is operating, the phase compensating capacitor 26 is discharged when the series regulator section 14 is operating and the switching regulator section 12 is not operating.

The PWM comparator 28 is a differential amplifier which has a function to compare the output voltage $V_4$ of the error amplifier which is input to the first terminal and a PWM reference voltage $V_5$ which is input to the second terminal, and output the differential voltage to the PWM converter 32. As described above, the output voltage $V_4$ of the error amplifier 24 is an error signal which indicates the error between the voltage $V_2$ which is fed back and input to the second terminal of the error amplifier 24 and the first reference voltage $V_1$.

The PWM reference voltage circuit 30 is a reference voltage source having a function to output the PWM reference voltage $V_5$. As the PWM reference voltage circuit 30, an oscillation waveform generating circuit which generates and outputs a signal of a saw-tooth waveform or a triangular waveform having a preset frequency may be used.

The PWM converter 32 is a circuit which generates a PWM signal in which the duty ratio is varied according to the output of the PWM comparator 28. Thus, the PWM signal is a rectangular wave having a pulse width corresponding to the size of the error signal.

The output stage circuit 34 is a buffer circuit which outputs the pulse signal which is the output of the PWM converter 32, with a low impedance.

The fifth switch 55 provided between the output stage circuit 34 and an inductor 36 is a first loop switching switch which is switched ON when the output of the switching regulator section 12 is output to the overall output terminal 18, and forms a feedback loop to feedback the voltage $V_7$ of the overall output terminal 18 to the error amplifier 24. As has been already described with reference to the structure around the error amplifier 24, the fifth switch 55 is switched ON in the PWM mode, is switched OFF in the LDO mode, and is switched OFF also in the transition mode.

The inductor 36 has a function to convert the pulse signal which is the output signal of the switching regulator section 12 into electromagnetic energy. More specifically, the inductor 36 stores the energy when the pulse signal is ON and discharges the stored energy to the overall output terminal 18 when the pulse signal is OFF. A suitable coil may be used as the inductor 36.

The capacitor 38 is an averaging capacitor which is provided between the overall output terminal 18 and the ground potential and inhibits a variation in the output voltage $V_7$ of the overall output terminal 18.

The switching regulator section 12 has been described. Next, the series regulator section 14 will be described. The series regulator section 14 comprises a second reference voltage circuit 40, a feedback amplifier 42, and the sixth switch 56.

The second reference voltage circuit 40 is a reference voltage source which generates a reference voltage $V_{10}$ in the series regulator section 14. The series regulator section 14 is a circuit which functions, with the operation of the feedback amplifier 42, to output a voltage which is identical to the second reference voltage $V_{10}$ even when there is a current variation or the like caused by the load.

The feedback amplifier 42 is an amplifier which has a reference voltage input terminal to which the second reference voltage $V_{10}$ is input, a feedback input terminal to which the output is input through a feedback gain, and an output terminal. Here, a resistor element $R_{11}$ and a resistor element $R_{10}$ are sequentially connected in series in this order from the output terminal toward the ground potential, and a connection point between the resistor element $R_{11}$ and the resistor element $R_{10}$ is connected to the feedback input terminal.

The sixth switch 56 is a switch provided between the feedback amplifier 42 and the overall output terminal 18, and is switched ON when the output of the series regulator section 14 is output to the overall output terminal 18. Similar to the fifth switch 55 being also called the first loop switching switch, the sixth switch 56 may also be called a second loop switching switch. As has already been described with reference to the structure around the error amplifier 24, the sixth switch 56 is switched OFF in the PWM mode, is switched ON in the LDO mode, and is switched ON in the transition mode.

The controller 16 has a function to control the overall operations of the elements of the switching regulator section 12 and the series regulator section 14, and according to the current required by the load connected to the overall output terminal 18, activates the switching regulator section 12 when the load is high and the series regulator section 14 when the load is low, to supply one of the outputs from the overall output terminal 18 to the load. More specifically, the controller 16 has a function to control ON/OFF states of the switching regulator section 12, ON/OFF states of the series regulator section 14, and ON/OFF states of six switches including the first switch 51 through the sixth switch 56, to execute switching control of five modes including the output OFF mode, soft start mode, PWM mode, LDO mode, and transition mode.

In the output OFF mode, as described with reference to FIG. 1, the switching regulator section 12 is switched OFF, the series regulator section 14 is switched OFF, and the six switches from the first switch 51 to the sixth switch 56 are all switched OFF.

FIG. 3 shows the state of the soft start mode. FIG. 3 is similar to FIG. 1, with some of the states of the six switches from the first switch 51 to the sixth switch 56 different from FIG. 1. The soft start mode is a mode at an initial stage of the PWM mode, where the function of the soft start circuit 22 is utilized to delay the first reference voltage $V_1$, which is the output voltage of the first reference voltage circuit 20, with a predefined rise characteristic and supply to the first terminal of the error amplifier 24.

In the soft start mode, the switching regulator section 12 is switched ON and the series regulator section 14 is switched OFF. The first switch 51 is switched OFF, the second switch 52 is switched OFF, the third switch 53 is switched ON, the fourth switch 54 is switched ON, the fifth switch 55 is switched ON, and the sixth switch 56 is switched OFF. This state is identical to the PWM mode which will be described with reference to FIG. 4.

FIG. 4 shows a state of the PWM mode. The PWM mode is similar to the soft start mode, with the switching regulator section 12 being switched ON and the series regulator section 14 being switched OFF. The first switch 51 is switched OFF, the second switch 52 is switched OFF, the third switch 53 is switched ON, the fourth switch 54 is switched ON, the fifth switch 55 is switched ON, and the sixth switch 56 is switched OFF.

In the PWM mode, the switching regulator section 12 is activated and the fifth switch 55, which is the first loop switching switch provided between the switching regulator section 12 and the overall output terminal 18, is switched ON to form the feedback loop between the overall output terminal 18 and the error amplifier 24 of the switching regulator section 12. In addition, the operation of the series regulator section 14 is stopped and the sixth switch 56, which is the second loop switching switch between the series regulator section 14 and the overall output terminal 18, is switched OFF so that the output of the switching regulator section 12 is output to the overall output terminal 18.

FIG. 5 shows a state of the LDO mode. In the LDO mode, many elements are in states opposite to those in the PWM mode. More specifically, the switching regulator section 12 is switched OFF, the series regulator section 14 is switched ON, the first switch 51 is switched ON, the second switch 52 is switched OFF, the third switch 53 is switched OFF, the fourth switch 54 is switched OFF, the fifth switch 55 is switched OFF, and the sixth switch 56 is switched ON.

In the LDO mode, the series regulator section 14 is activated, the sixth switch 56, which is the second loop switching switch, is switched ON, the operation of the switching regulator section 12 is stopped, and the fifth switch 55, which is the first loop switching switch, is switched OFF, to open the feedback loop between the overall output terminal 18 and the error amplifier 24 and output the output of the series regulator section 14 to the overall output terminal 18.

FIG. 6 shows a state of the transition mode. The transition mode is a mode which is executed when the state is switched from the LDO mode to the PWM mode, and is a mode in which an artificial feedback loop is formed around the error amplifier 24 and the phase compensating capacitor 26 is charged with a stable voltage, while taking advantage of the LDO mode. In the transition mode, the switching regulator section 12 is switched ON and the series regulator section 14 is also switched ON. The first switch 51 is switched ON, the second switch 52 is switched ON, the third switch 53 is switched ON, the fourth switch 54 is switched ON, the fifth switch 55 is switched OFF, and the sixth switch 56 is switched ON.

In the transition mode, as described above, a transition process is executed when the state is switched from the state where the output of the series regulator section 14 is output to the overall output terminal 18 to the state where the output of the switching regulator section 12 is output. In the transition process, the series regulator section 14 and the switching regulator section 12 are both activated, the fifth switch 55, which is the first loop switching switch is switched OFF to temporarily open the feedback loop of the switching regulator section 12, the sixth switch 56, which is the second loop switching switch, is maintained at the ON state to output the output of the series regulator section 14 to the overall output terminal 18, and an artificial feedback loop is formed between the output terminal of the error amplifier 24 and the second terminal of the error amplifier 24 so that a voltage corresponding to the output of the series regulator section 14 is output on the output terminal of the error amplifier 24 and the phase compensating capacitor 26 of the switching regulator section 12 is charged. Then, the artificial feedback loop is opened, to re-form the feedback loop between the overall output terminal 18 and the error amplifier 24 of the switching regulator section 12.

The operation of the above-described structure will now be described with reference to a timing chart of FIG. 7. For reference, FIG. 8 shows a timing chart for the power supply circuit of the related art of FIG. 2, that is, a power supply circuit which does not have the transition mode when the state is switched from the state where the output of the series regulator is output to the overall output terminal to the state where the output of the switching regulator is output.

Figure 7:
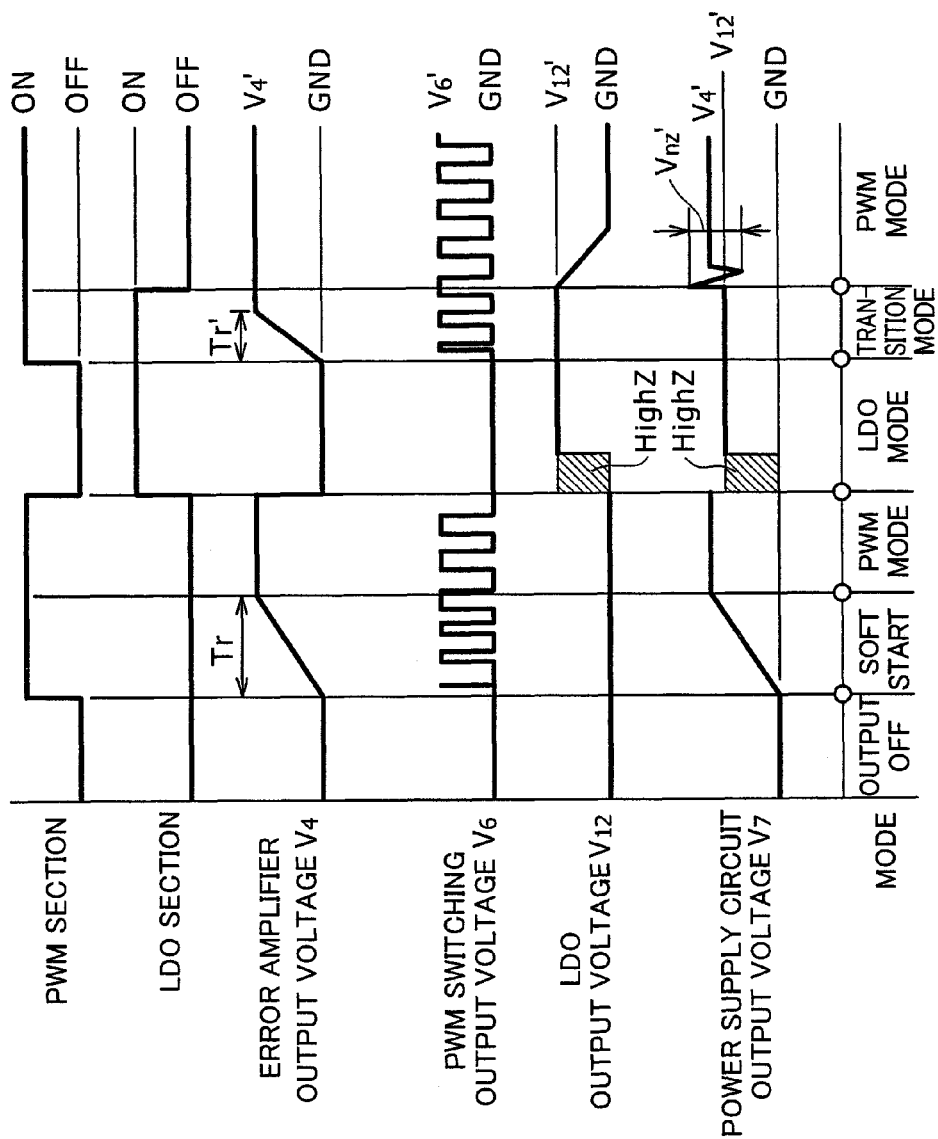
FIG. 7 is a timing chart showing a change of states of the constituent elements corresponding to a change of a mode of the power supply circuit in a preferred embodiment of the present invention.
Figure 8:
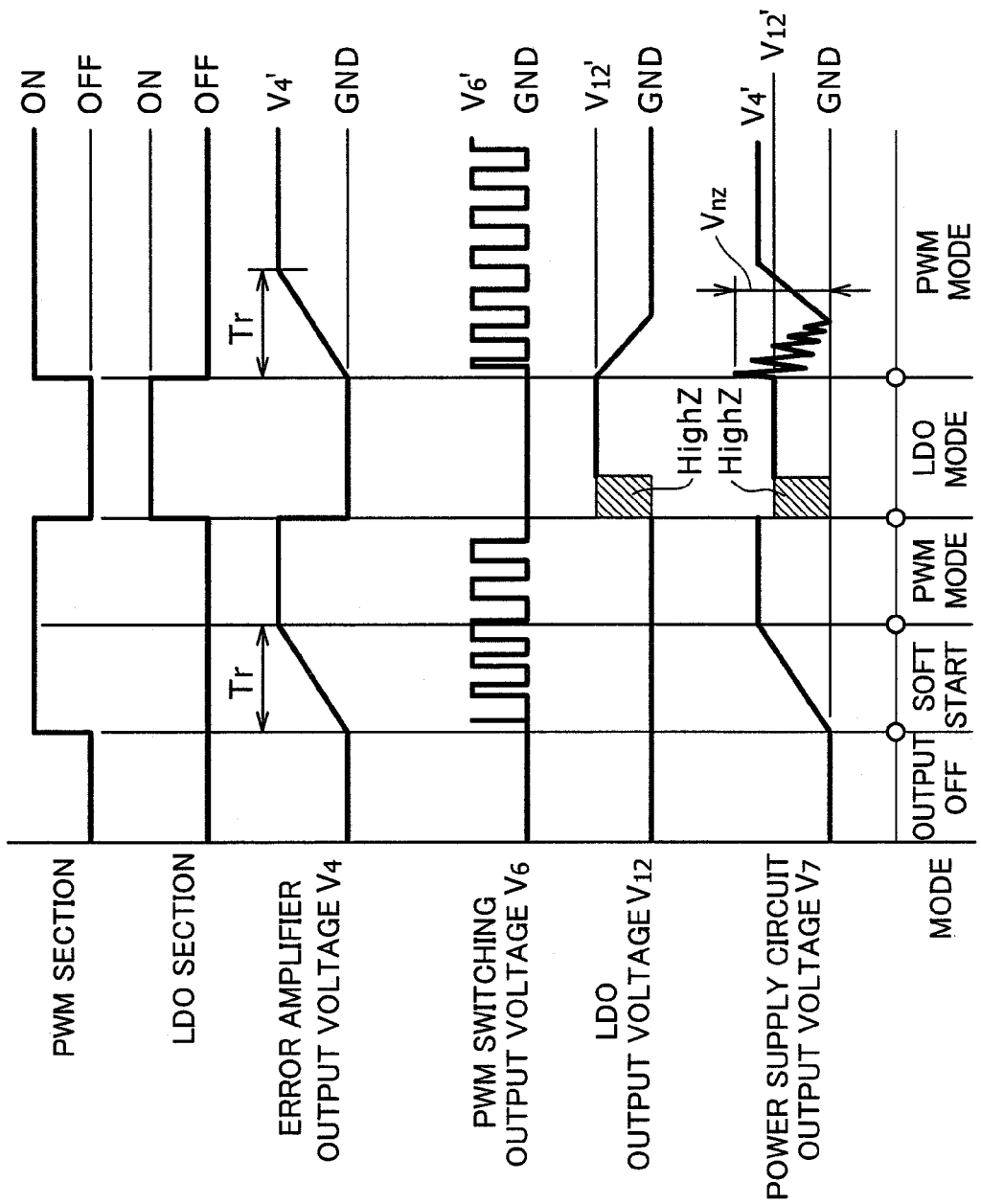
FIG. 8 is a timing chart showing a change of states of the constituent elements corresponding to a change of a mode of the power supply circuit in related art.

FIG. 7 is a diagram showing, in time sequence, changes of the states of the elements when the operation mode of the power supply circuit 10 sequentially changes from the output OFF mode to the soft start mode, PWM mode, LDO mode, transition mode, and PWM mode. The horizontal axis in FIG. 7 represents time and the vertical axis of FIG. 7 represents, from top to bottom of the page, the ON/OFF state of the switching regulator section 12 which is the PWM section, the ON/OFF state of the series regulator section 14 which is the LDO section, the output voltage $V_4$ of the error amplifier 24, the PWM switching output voltage $V_6$, the LDO output voltage $V_{12}$, and the output voltage $V_7$ of the power supply circuit 10.

In the output OFF mode, all elements are switched OFF or in the GND state. In the soft start mode, the PWM section is switched ON and the output voltage $V_4$ of the error amplifier 24 rises with a delay. A rise time $T_r$ is the rise characteristic which is predefined in the soft start circuit 22. In synchronization with the rise of the output voltage $V_4$ of the error amplifier 24, the pulse width of the PWM switching output voltage $V_6$ is gradually widened. In addition, in synchronization with these, the output voltage $V_7$ of the power supply circuit 10 similarly rises.

In the soft start mode, after the rise time $T_r$ is elapsed, the output voltage $V_4$ of the error amplifier 24 becomes substantially constant, and the pulse width of the PWM switching output voltage $V_6$ also becomes substantially constant. Correspondingly, the output voltage $V_7$ of the power supply circuit 10 also becomes substantially constant.

In the soft mode and the PWM mode, the LDO section is switched OFF. When the state is next switched to the LDO mode, the LDO section is switched ON and the PWM section is switched OFF. With this configuration, the output voltage $V_4$ of the error amplifier 24 becomes the GND potential, and consequently the phase compensating capacitor 26 starts to discharge. The PWM switching output voltage $V_6$ also becomes the GND potential. The LDO output voltage $V_{12}$, on the other hand, becomes a high impedance in the rise stage, but eventually becomes a constant voltage level. Correspondingly, the output voltage $V_7$ of the power supply circuit 10 also becomes a constant voltage corresponding to $V_{12}$.

Next, when the state is switched from the LDO mode to the PWM mode, the process of the transition mode is executed. In the transition mode, while the LDO section is maintained at the ON state, the PWM section is also switched ON. As has already been described with reference to the soft start circuit 22, the first switch 51 is switched ON, the soft start circuit 22 is bypassed, and the first reference voltage $V_1$ is directly supplied to the first terminal of the error amplifier 24. Therefore, a rise time $T_r'$ of the output voltage $V_4$ of the error amplifier is shortened compared to the rise time $T_r$ in the soft start mode. As has already been described in relation to the structure around the error amplifier 24, the second switch 52 is switched ON, the LDO output voltage $V_{12}$ is supplied to the error amplifier 24, an artificial feedback loop having a simple loop without the PWM converter 32 is formed, a stable voltage is output from the error amplifier 24, and the phase compensating capacitor 26 is charged with the stable voltage.

FIG. 7 shows that in the transition mode, the output voltage $V_4$ of the error amplifier rises rapidly, and correspondingly the pulse width is gradually widened in the PWM switching output voltage $V_6$. The LDO output voltage $V_{12}$ is maintained at the value during the LDO mode. Correspondingly, the output voltage $V_7$ of the power supply circuit 10 is maintained at a value of the LDO mode.

After a time sufficient for charging the phase compensating capacitor 26 has elapsed, the transition mode is completed and the LDO section is switched OFF. With this process, the LDO output voltage $V_{12}$ is gradually reduced, eventually to the GND potential. During this process, switching noise occurs in the output voltage $V_7$ of the power supply circuit 10. However, the voltage amplitude $V_{nz}'$ of the switching noise is significantly smaller compared to the voltage amplitude $V_{nz}$ of the switching noise occurring in FIG. 8 which is shown as a reference. This is because the phase compensating capacitor 26 is sufficiently charged in the transition mode. With this structure, the later operations of the PWM mode are smoothed, and as shown in FIG. 7, the output voltage $V_4$ of the error amplifier becomes a substantially constant voltage level, the pulse width of the PWM switching output voltage $V_6$ becomes substantially constant, and consequently, the output voltage $V_7$ of the power supply circuit 10 becomes a substantially constant voltage.

FIG. 8 which is shown as a reference is similar to FIG. 7 in the horizontal axis and vertical axis except that there is no transition mode. During switching from the LDO mode to the PWM mode, because the charging starts with the phase compensating capacitor 26 in the discharged state, a large current flows to the inductor 36 and switching noise having a large voltage amplitude $V_{nz}$ occurs in the output voltage $V_7$ of the power supply circuit. As described, in the related art, the output voltage $V_7$ of the power supply circuit may change significantly during the switching from the LDO mode to the PWM mode.

What is claimed is:

1. A power supply circuit in which an output of a switching regulator section and an output of a series regulator section are switched and output to an overall output terminal, the power supply circuit comprising:
   a switching regulator output unit which activates the switching regulator section, switches a first loop switching switch provided between the switching regulator section and the overall output terminal to an ON state, to form a feedback loop between the overall output terminal and an error amplifier of the switching regulator section, stops operation of the series regulator section, and switches a second loop switching switch between the series regulator section and the overall output terminal to an OFF state, to output the output of the switching regulator section to the overall output terminal;
   a series regulator output unit which activates the series regulator section, switches the second loop switching switch to an ON state, stops operation of the switching regulator section, and switches the first loop switching switch to an OFF state, to open the feedback loop between the overall output terminal and the error amplifier and output the output of the series regulator section to the overall output terminal; and a transition process unit which applies a transition process in which, when a state is switched from a state where the output of the series regulator section is output to the overall output terminal to a state where the output of the switching regulator section is output to the overall output terminal, the first loop switching switch is switched to an OFF state while the series regulator section and the switching regulator section are activated, to temporarily open the feedback loop of the switching regulator section, the second loop switching switch is maintained in the ON state, to output the output of the series regulator section to the overall output terminal, an artificial feedback loop is formed between an output terminal of the error amplifier and a second terminal of the error amplifier, to output a voltage corresponding to the output of the series regulator section on the output terminal of the error amplifier and charge a phase compensating capacitor of the switching regulator section with the output voltage, and then, the artificial feedback loop is opened, to re-form the feedback loop between the overall output terminal and the error amplifier of the switching regulator section.

2. The power supply circuit according to claim 1, wherein the switching regulator section comprises:

as the error amplifier, an error amplifier which generates an error signal indicating an error between a first reference voltage which is input to a first terminal and a voltage which is input to the second terminal;

a PWM circuit section which generates a PWM signal in which a duty ratio is varied according to the error signal;

as the phase compensating capacitor, a capacitor provided between the output terminal of the error amplifier and the PWM circuit section;

a coil provided between the PWM circuit section and the overall output terminal;

as the first loop switching switch, a switch provided between the PWM circuit section and the coil; and as the feedback loop, a signal loop which returns an output voltage of the overall output terminal to a side of the second terminal of the error amplifier, and the series regulator section comprises:

a feedback amplifier having a reference voltage input terminal to which a second reference voltage is input, a feedback input terminal to which an output is input through a feedback gain, and an output terminal section; and as the second loop switching switch, a switch provided between the feedback amplifier and the overall output terminal.

3. The power supply circuit according to claim 1, wherein the feedback loop of the switching regulator section comprises;

a second resistor and a first resistor which are sequentially connected in series from the overall output terminal toward a ground potential; and a return signal line which connects a connection point between the second resistor and the first resistor, and the second terminal of the error amplifier, the switching regulator further comprises, as a switch for forming the artificial feedback loop by being switched ON during the transition process, an artificial feedback loop forming switch provided between a dividing point when the second resistor is divided into two resistance components connected in series and the output terminal of the error amplifier, and the division of the second resistor is set so that an output voltage value of the error amplifier when the feedback loop of the switching regulator is formed through the second resistor, and an output voltage value of the error amplifier when the artificial feedback loop forming switch is switched ON and the artificial feedback loop is formed through a divided component of the second resistor, match each other.

4. The power supply circuit according to claim 1, wherein the switching regulator section further comprises:

a soft start unit which is provided between a first reference voltage source which generates a first reference voltage and a first terminal of the error amplifier, and which supplies the first reference voltage to the first terminal of the error amplifier with a predefined rise characteristic; and a bypass switch which enables bypassing of the soft start unit, and the transition process unit switches the bypass switch to an ON state during the transition process, to directly supply the first reference voltage to the first terminal of the error amplifier.

* * * * *